United States Patent
Dent

[15] 3,652,111
[45] Mar. 28, 1972

[54] METHOD OF SWAGE JOINING A METALLIC TUBE TO AN INSERT AND THE PRODUCT THEREOF

[72] Inventor: Robert K. Dent, 17765 Beach Drive, N. E., Seattle, Wash. 98155

[22] Filed: Dec. 10, 1969

[21] Appl. No.: 883,904

[52] U.S. Cl....................................285/382, 287/109
[51] Int. Cl..............................................F16l 13/14
[58] Field of Search...............285/382; 10/152 R, 153; 29/516, 517; 287/109, 125

[56] References Cited

UNITED STATES PATENTS

| | | | |
|---|---|---|---|
| 2,862,215 | 12/1958 | Gross | 10/153 |
| 3,239,930 | 3/1966 | Violleau | 10/153 X |
| 2,092,358 | 9/1937 | Robertson | 285/382.4 X |
| 2,488,566 | 11/1949 | Sperry | 287/125 |
| 2,787,481 | 4/1957 | Buschow et al. | 285/329 |
| 3,425,719 | 2/1969 | Burton | 285/382.2 |
| 2,267,923 | 12/1941 | Johnson | 285/334 |

FOREIGN PATENTS OR APPLICATIONS

| | | | |
|---|---|---|---|
| 897,635 | 5/1962 | Great Britain | 287/109 |
| 232,328 | 4/1925 | Great Britain | 287/109 |
| 129,362 | 12/1928 | Switzerland | 287/109 |

*Primary Examiner*—Andrew V. Kundrat
*Attorney*—Clinton L. Mathis

[57] ABSTRACT

There is disclosed an insert of cylindrical shape and of substantially uniform predetermined diameter and length. This insert has a greater hardness than the tube to be employed. Thus, generally, the tube is an aluminum alloy tube and the insert is stainless steel to provide the desired comparative hardnesses. For convenience in handling of the insert during the process, a cylindrical, coaxial recess is drilled in the insert. A conventional thread-rolling device is provided with dies of a hardness greater than the insert and the pattern on the contacting surfaces of said dies is a plurality of annular, spaced, alternate crests and grooves. The crests and grooves are disposed in two longitudinally spaced sections and with the grooves and crests in the first section each having a common diameter and with the diameters of the crests and grooves in the second section each having gradually decreasing diameters. Such dies are used to form a pattern of annularly spaced grooves and crests on the surface of the insert. The crests in the first section of the dies imprint grooves in a first section on the insert and which grooves have a common diameter. The material displaced in the insert, in the imprinting and forming of such grooves, migrates laterally from the grooves or in a direction longitudinally of the insert and forms the crests of uniform diameter in the first section on said insert. The crests in the second section of the dies imprint grooves in a longitudinally spaced second section on the insert and which grooves have gradually increasing diameters. The material displaced in forming said grooves in said second section of said insert forms crests which are not fully formed and which gradually decrease in diameter. Next, and prior to swaging of a tube upon said insert, the insert is provided with a plurality of longitudinally extending grooves by imprinting the said insert with an appropriate tool thus causing said grooves and causing a raise of stock elsewhere of the insert by the same amount as the extent of the said grooves.

Thereafter, a tube end portion of less hardness than said insert is slidingly fitted over said insert and the tube is swaged to the insert. The crests of the insert imprint grooves in the tube and the material migrates to form crests in the tube. As the crests of the insert were formed by metal migrating from grooves to form the same, the said crests of said insert will cause grooves and concomitant migration of metal to form precisely the crests in the tube. In order to ensure against any possible slight voids, there is provided a slight migration over that necessary to form the crests in the tube mating with the grooves on the insert and the longitudinally extending ridges mating with the longitudinally extending grooves of the insert. This swaging provides for cold working of the aluminum of the tube and improves the strength qualities thereof.

6 Claims, 8 Drawing Figures

PATENTED MAR 28 1972 3,652,111

INVENTOR.
ROBERT K. DENT
BY
Clinton L. Mathis
ATTORNEY

INVENTOR.
ROBERT K. DENT

INVENTOR.
ROBERT K. DENT
BY
Clinton L. Mallis
ATTORNEY

METHOD OF SWAGE JOINING A METALLIC TUBE TO AN INSERT AND THE PRODUCT THEREOF

My invention relates to the method of swage joining a metallic tube to an insert and the product thereof.

More particularly, my invention relates to the cold rolling of a metallic insert to form thereon alternately spaced annular crests and grooves. Preferably, the crests and grooves are located in two longitudinally spaced sections, with the grooves and crests in a first section each having a common diameter and the grooves in the second section each having gradually increasing diameters and the crests in the second section each having gradually decreasing diameters.

It is of substantial importance in my invention that the grooves be cold rolled in such inserts so that the crests between the grooves are formed by metal migrating laterally during the cold rolling process.

It is also of substantial importance in my invention that a tube end portion of lesser hardness than said insert be swaged to said insert so that the crests of said insert imprint or form grooves in said tube and that the metal migrating laterally in forming said grooves in said tube will be precisely the amount of metal necessary to form the crests in said tube mating with the grooves in said insert.

As an example of my invention, the same will be described and illustrated in connection with tubes employed in the aircraft art used where the load thereon is of the push-pull nature. In such art the cross section of the tubes is determined by such factors, as: (1) weight, (2) total safe load, (3) diameter to provide rigidity or stiffness for compression loads. Also, it is common to reduce the terminal end portions of such tubes to aid in the securing of load-attaching means to such end portions.

Heretofore the terminal end portions of such tubes and the connections thereof to load-attaching means posed one of the greatest problem in this art. Substantial mass and weight of material were required to provide the desired strength to the same, all of which is to a very substantial disadvantage in the aircraft art.

In the prior art, as an Example No. 1, often terminal fittings or plugs were made having an internally threaded end portion, a wrench-fittable center portion, and a sleeve end portion. Then an end portion of a tube was swaged to a size to snugly fit such sleeve end portion of the fitting. Then two rivets were inserted through the assembly into two longitudinally spaced holes drilled at right angles to each other to secure the fitting to the tube. For comparative purposes, with an aluminum tube of ¾ inch OD and a wall thickness of 0.049 inch and with the load-attaching means comprising a ⅜ inch--24 female thread, a typical tube and such fitting often resulted in a tension breaking test value of about 3,000 pounds.

An improvement, as Example No. 2, was to swage the end portions of the same size of aluminum tube down to the largest diameter which can be drilled and tapped to provide a ⅜ inch--24 female thread. A typical tube so made and a fitting threaded thereto results in a tension break test value of about 4,600 pounds.

Heretofore the said tubes and fittings, described in said Examples 1 and 2 and connected to one or both ends of said tubes, comprise most of the tubular members used in American aircraft art where push-pull loads were involved.

It is an object of my invention to provide a tube and load-attaching means with improved tensile and fatigue strength capabilities over those indicated above or any others commonly and currently used in the American aircraft art. For example, as compared to Examples 1 and 2 above and with the same size aluminum tube and with the same size ⅜ inch--24 female thread for attaching to a load, devices of my invention commonly have a tension breaking test value of about 78000.

It is a further object to imprint grooves on an insert which will generate crests in the insert by lateral migration of material and which crests in said insert will, during swaging of a tube to said insert, imprint grooves in the tube. During formation of said grooves in said tube, crests will be generated by lateral migration of material.

It is a further object to preferably form grooves and crests in said insert and on said tube wherein the flank angle is approximately 60°.

It is a further object to preferably swage a tube to such an insert and to subsequently drill and tap the insert with a female thread to provide a load-attaching means.

Figure 1:
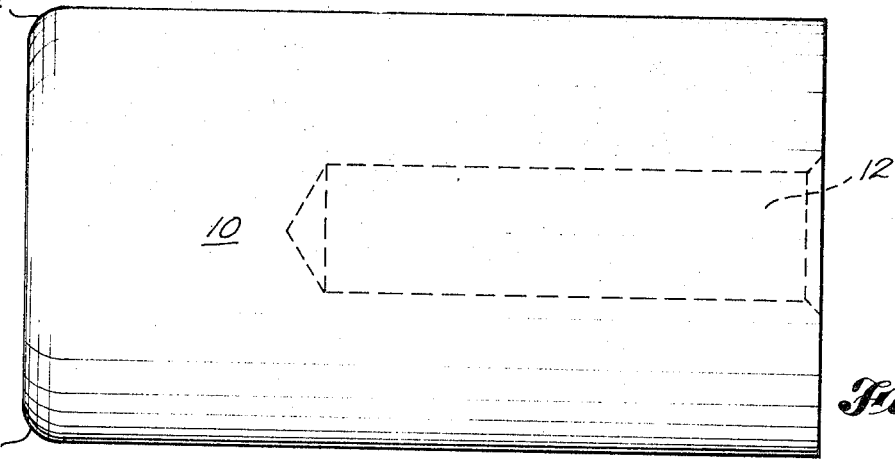
FIG. 1 is an elevational view of a blank of a typical insert employed in my invention.

In preparing an insert of my invention, the diameter and length thereof will depend upon the individual requirements of the tube to which the insert is to be secured and the size of the threaded member to be secured to the insert. Thus, by way of example, if the insert is to be later drilled and tapped to receive a threaded member having a ⅜inch--24 thread, a suitable minimum diameter of the blank of the insert 10 may be 0.430 inch. Also, to provide for adequate length for such insert, the same may have a minimum length of 0.800 inch. A drilled internal recess 12 in the insert 10 provides means by which the insert may be handled during assembly. The recess 12 is located in one end portion of the insert 10 and the other end portion of the insert 10 has the outer end portion 14 turned and the radius of the turn, in section, is approximately 0.04 inch. The said insert 10 is preferably machined to a diameter, with a tolerance of plus or minus 0.005 inch. The next step in my process is the rolling, preferably, of annular crests and valleys (as distinguished from helical grooves and crests such as in connection with threads) on the insert 10. The hardness of the roll dies 16 and 18 of the rolling machine (FIG. 2) must be harder than the insert 10 so that the pattern of the roll dies 16 and 18 is imprinted on the insert 10 and the pattern on the roll dies 16 and 18 is unchanged in making such imprint.

Figure 2:
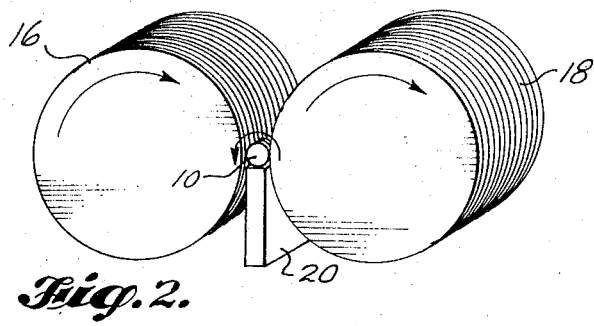
FIG. 2 is a schematic view, on a smaller scale than FIG. 1, of a rolling machine for rolling crests and grooves on an insert of my invention.

Referring to FIG. 2, a rolling machine is schematically shown by the roll dies 16 and 18 and the rest or insert support 20. Rolling machines employing roll dies to roll threads on shanks, bolts, and the like are in common usage. At times, but not as common as thread rolling dies, roll dies are employed to roll annular crests and grooves on cylindrical members. In order to roll annular crests and grooves on shanks and the like, the roll dies must have a pattern of crests and grooves. During the rolling of the annular crests and grooves on the insert 10 between the roll dies 16 and 18, the roll dies 16 and 18 will rotate in the same direction (either clockwise or counter-clockwise) and, by way of example, the arrows are shown as clockwise. Also, the roll dies 16 and 18 will move relatively toward and away from each other (as a first one thereof being stationary and the other one thereof mounted for movement toward and away from said first one). The speed or rotation of the roll dies, the rate of relative travel toward each other, the amount of travel, the amount of pressure, and the like, are all considerations which are well understood in the art of thread rolling, do not form a part of this invention, and hence the schematic showing in FIG. 2.

If the final product is an aluminum alloy tube with an insert therein to be drilled and tapped subsequent to the swaging of the tube to the insert, stainless steel is a suitable material for the insert 10. Thus, if the insert 10 is stainless material, such stainless material is obviously a harder material than the aluminum alloy of tube 22. Also, the roll dies 16, 18 must be harder than the insert 10 so that the contour or pattern of the roll dies 16, 18 is not changed by the use thereof in imprinting a pattern on the insert 10.

Figure 3:
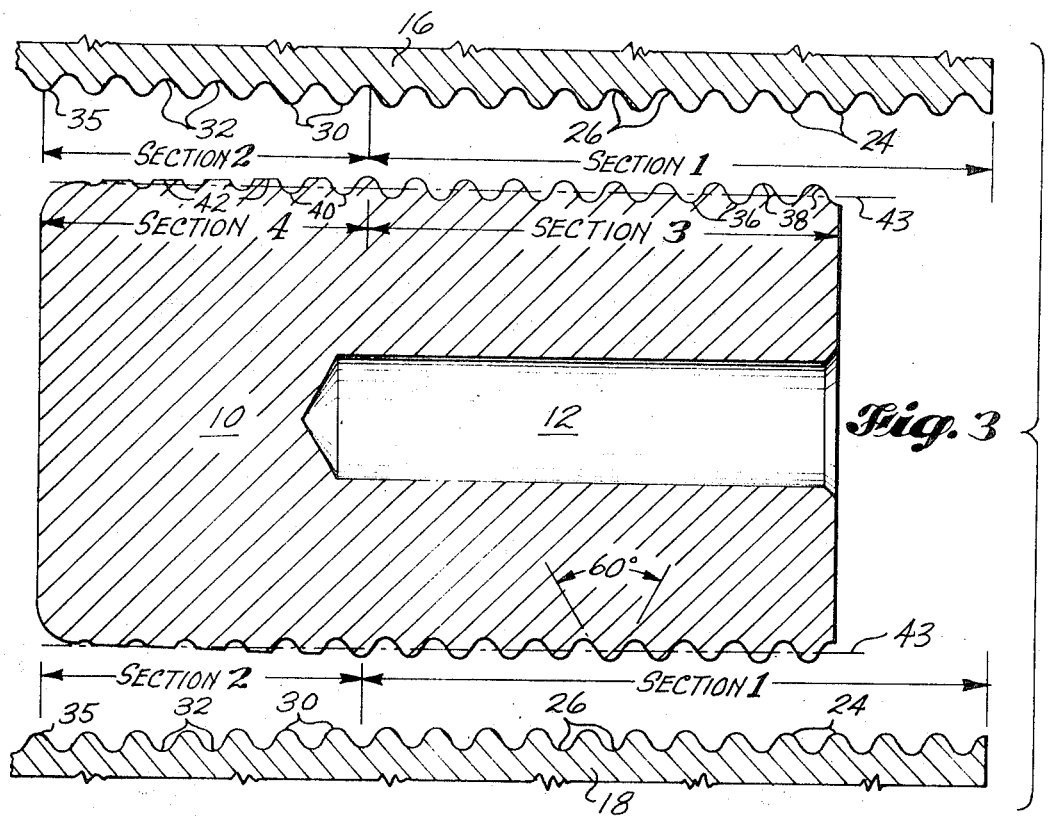
FIG. 3 is a fragmentary, elevational view, on scale of FIG. 1, of the roll dies and an insert just after completion of the rolling of the insert and opening of the roll dies.
Figure 4:
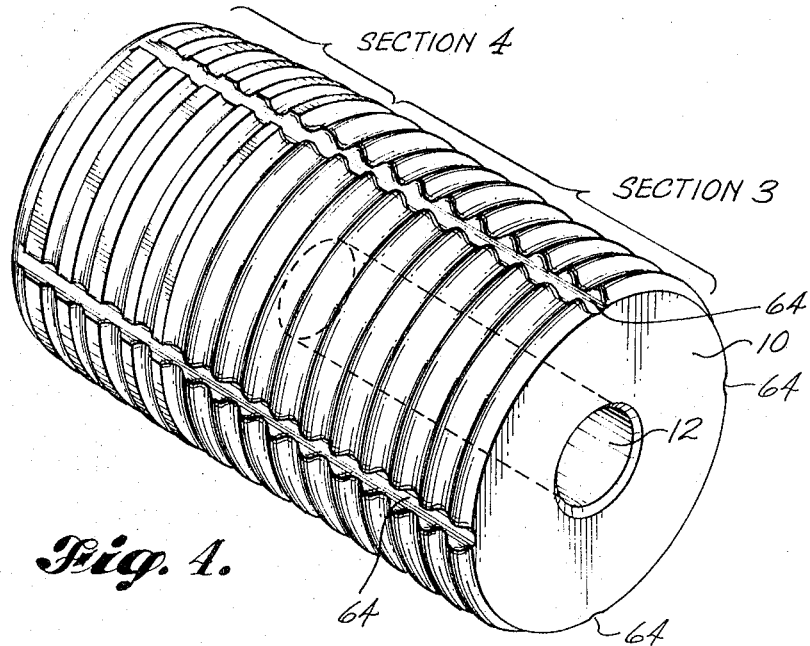
FIG. 4 is a perspective view of an insert of my invention.
Figure 5:
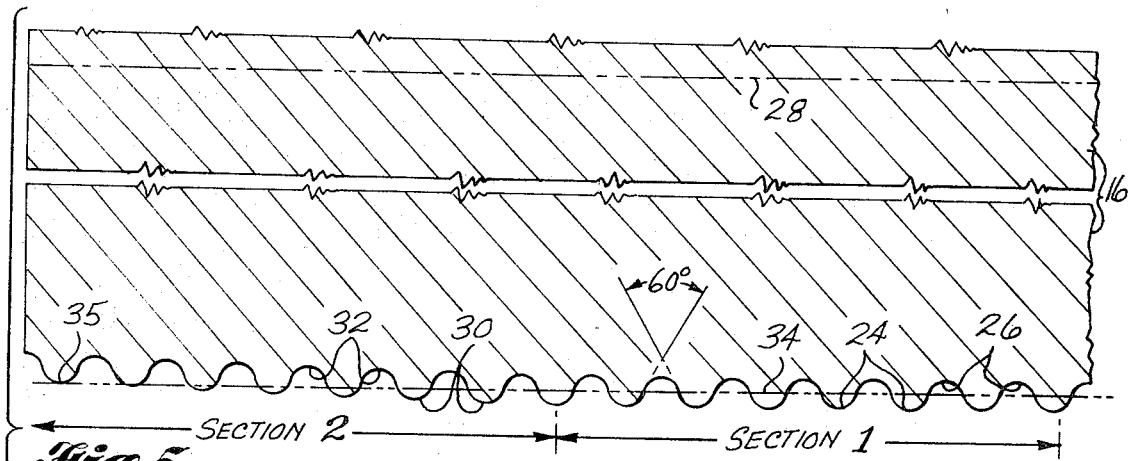
FIG. 5 is a fragmentary, enlarged, elevational view of one of the roll dies of the rolling machine of FIG. 2.

Referring now to FIGS. 3, 4, and 5, and more particularly to FIG. 5, and to the section marked "Section 1," the annular crests 24 of the roll dies 16 and 18 have a common diameter and the annular grooves 26 in said section have a common diameter. In other words, the said crests 24 in said Section 1 have the same radii from the axis 28 of the roll die 16 and the said grooves 26 have the same radii from the said axis 28.

In the section marked "Section 2" of FIG. 5, the annular crests 30 have gradually decreasing diameters or, in other words, the radii from the axis 28 gradually decrease starting from the full or common radii of Section 1. Also, the annular grooves 32 of said Section 2 have gradually decreasing diameters or, in other words, the radii from the axis 28 gradually decrease starting from the full radii or common radii of Section 1. Thus, a line 34, parallel to axis 28, will be the mean diameter of the crests 24 and grooves 26 in section 1 and said line 34 will be tangent to the crest 35 which is the last crest in Section 2 remote from Section 1 of said roll dies 16 and 18.

The annular grooves and crests on the insert 10 will be formed, respectively, by the crests and grooves of the roll dies 16 and 18. Grooves 36 and crests 38 (FIG. 3) will be formed in Section 3 of insert 10 and will be symmetrical and mate with the crests 24 and grooves 26 of the roll dies 16 and 18. Grooves 40 and crests 42 will be formed in Section 4 of the insert 10. Due to the decreasing diameters of the crests 30 in Section 2 of the roll dies 16 and 18, the imprint thereof on insert 10 (which originally had a common diameter) will be decreasing depths of imprinting and thus the grooves 40 in Section 4 of the insert 10 will have gradually increasing diameters until the crest 35 in Section 2 of the roll dies 16 and 18 will not cause a recess in the insert 10. The line 43 in the insert 10 represents the original diameter of the insert 10 and thus the distance of the grooves 36 and crests 38 and the grooves 40 and crests 42 away from said line illustrates the depth of the imprinting of grooves and the buildup of crests. The crests 24 in Section 1 of the roll dies 16 and 18 imprint the grooves 36 in Section 3 of insert 10 by displacing metal in the insert 10. The displaced metal moves laterally during such imprinting of such grooves 36 and forms the adjacent crests 38. There is substantially no compression of the metal and the amount of metal displaced to form the grooves 36 moves laterally to form the crests 38. At the same time, due to cold working of the metal by the rolling process, the mechanical properties of the metal in insert 10 are improved as to hardness and strength. In imprinting the grooves 40 in Section 4 of the insert, the diameters of the crests 30 in Section 2 of the roll dies 16 and 18 are gradually decreasing and thus the depths of said grooves 40 gradually diminish. With the decrease of the depths of the grooves 40, there is less metal being moved laterally and thus the height of the crests 42 gradually decreases and said crests are not fully formed to mate with the matching grooves 32 in Section 2 of the roll dies 16 and 18. However, the amount of metal displaced and moved laterally in forming the grooves 40 in Section 4 of the insert 10 is substantially the same amount of material as exists in crests 42. Also, the insert 10 has a Section 4 which has improved properties due to the cold working of the metal in forming the crests and grooves in said Section 4 of the insert 10.

The said insert 10 started with an example diameter of 0.430 inch with a tolerance of plus or minus 0.0005 inch. After rolling of said insert 10, the diameter of the crests 38 (Section 3) will be 0.445 inch to 0.450 inch in the example.

Figure 6:
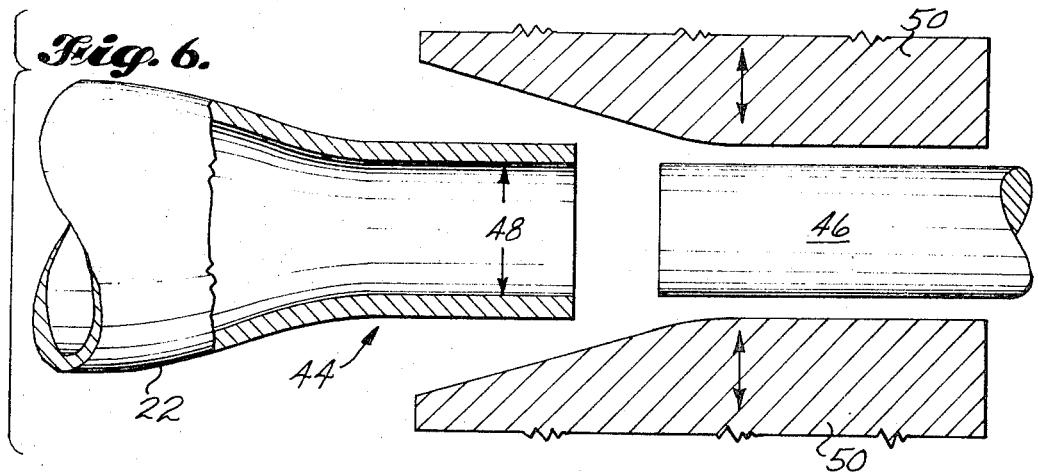
FIG. 6 is a schematic view, on a smaller scale, showing swaging dies, mandrel, and a tube swaged to a predetermined size, as to internal and outside diameters, for use in my invention.
Figure 7:
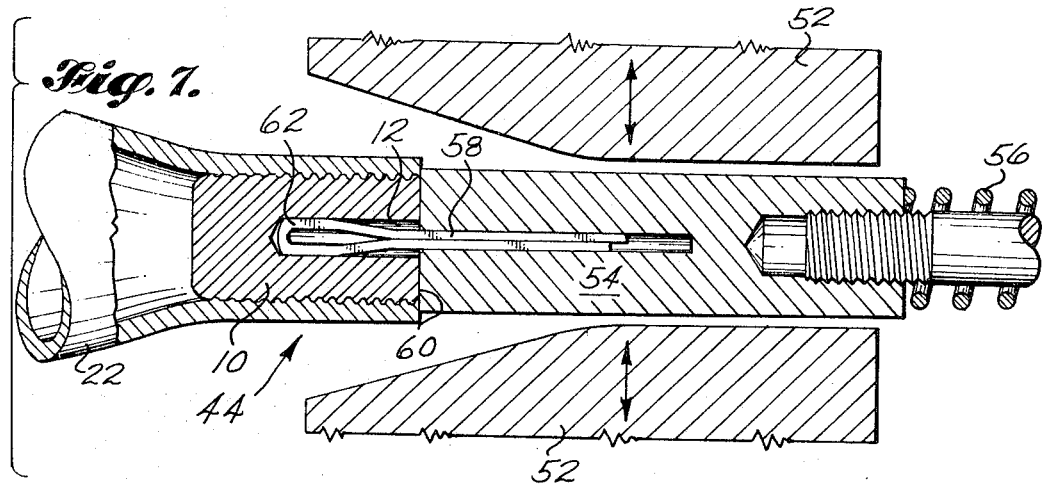
FIG. 7 is a schematic view showing swaging dies, a tube and an insert employed in my invention, the relative position of the parts being that of assembly after swaging.

Referring to FIG. 7, the end portion 44 of a tube 22 is illustrated as swaged to an insert 10 having crests and grooves thereon. In order to provide the necessary external and internal diameters to said end portion 44, prior to being swaged by the apparatus of FIG. 7, the said tube end portion 44 is swaged to an initial preliminary size by the apparatus in FIG. 6. Thus, by way of example the mandrel 46 has a diameter of 0.453 inch to presize the internal diameter 48 of tube end portion 44 to provide for a sliding fit between the insert 10 and tube end portion 44. Also, the swaging dies 50 move toward and away from each other and also rotate while so moving, all in accordance with conventional manner and in accordance with common practice. The end result is to swage the end portion 44 of the tube 22 to a predetermined ID and a predetermined OD such as, respectively, 0.455 inch and 0.600 inch. Thus, a predetermined wall thickness of the end portion 44 of tube 22 is secured by operation of the swaging dies 50 and mandrel 46 illustrated in FIG. 6.

Reasons for requiring a predetermined ID and OD for the end portion 44 of the tube 22 prior to the swaging operation illustrated in FIG. 7 or, in other words, to the ID and OD sizes resulting from the operation in FIG. 6 are: first, the ID must allow for a sliding fit of the end portion 44 of the tube 22 over the insert 10 having grooves 36, crests 38, grooves 40, and crests 42 thereon. Second, the ID and OD must be selected as those that can be uniformly obtained from the stock material available in the end portion 44 prior to the operation in accordance with FIG. 6. Thus, the size of the mandrel 46 and the closed diameter of the swaging dies 50 are first selected by the stock of material available and in the example are, respectively, 0.453 inch and 0.600 inch diameters.

After the rolling operations on insert 10 in accordance with the showing of FIG. 3 and the description thereof, the said insert 10 is suitably supported to prevent damage to the grooves 36, crests 38, grooves 40, and crests 42. Then a plurality of longitudinally extending grooves 64 are imprinted by a die in the surface of insert 10. The grooves 64 may be four in number as illustrated and spaced apart circumferentially at 90°. The grooves 64 are of gradually decreasing depth and the greatest depth is in Section 3 on insert 10 and the grooves taper out similar to the tapering out of grooves 40 and crests 42 in Section 4 of insert 10.

Now referring to FIG. 7, the swaging dies 52 and mandrel 54 are conventional in construction and operation. The mandrel 54 is loaded by spring 56 so that the mandrel 54 will move lengthwise and out of the die cavity between swaging dies 52 or into the die cavity between the swaging dies 52. When the mandrel 54 is moved out of the die cavity between the dies 52 as shown in FIG. 7 of the drawings, then the mandrel is accessible for mounting an insert thereon. Also, the mandrel 54 mounts a spring clip 58 axially thereof. End portion 60 of mandrel 54 provides a stop for engagement by a portion 44 of the tube 22.

In swagging an insert 10 to an end portion 44 of the tube 22, an insert 10 is first secured to the mandrel 54 by inserting the spring clip 58 into the recess 12 of insert 10. The spring portion 62 of the spring clip 58 resiliently engages the wall of the recess 12 of insert 10 and holds the base of the insert tightly against the end portion of the mandrel 54. The end portion 44 of the tube 22 is inserted over the insert 10 and until the end of the tube 22 abuts against the end portion 60 of the mandrel 54. Then the tube 22, insert 10, and mandrel 54 are moved as a unit into the swaging die cavity between swaging dies 52. As an example, the dies 52 will swage a unit therein to an OD of 0.570 inch.

During swaging of the end portion 44 of aluminum alloy tube 22 to the insert 10, the aluminum is cold formed to an internal configuration precisely following the external configuration of the insert 10, including (see FIG. 3) the crests 38 and grooves 36 of Section 3 and the crests 42 and grooves 40 of Section 4. Also, the external diameter of the end portion 44 of tube 22 in the example, is swaged to an OD of 0.570 inch. During such swaging, the metal of the tube 22, migrates to substantially fill all voids as the amount for clearance, grooves 36, grooves 40, and longitudinal grooves 64. To ensure such substantial filling of such voids and such grooves, there is a small amount of additional longitudinal migration of metal but this is very limited so as not to be a substantial amount. This limitation is brought about by the presizing of the end portion 44 of the tube 22 as described in connection with FIG. 6 for use in connection with the particular size of insert 10 for swaging in the combination described in connection with FIG. 7. However, all substantial amounts of migration of metal over that necessary to fill grooves in the insert 10, during the swaging of FIG. 7, are to be avoided as the tube end portion 44 has its internal surface held by the crests 38 and 42, and if there is any substantial migration of the external surface portion of said tube end portion 44, there is metal separation and degrading of the mechanical properties of the aluminum alloy metal of the tube 22.

Due to the fact that the insert 10 had an original, predetermined, uniform diameter and the amount of material displaced in rolling grooves 36 and 40 is the same amount of material as moved or migrated in forming crests 38 and 42, it can be stated that the mean diameter of said grooves and crests is the original diameter of the inert 10. Also, as this insert is, in effect, a die (in connection with the swaging of the end portion 44 of tube 22 to said insert 10), and the grooves and crests may be said to be rolled internally in a tube end portion 44 during such swaging, again the internal grooves and crests of the tube will have a mean diameter equal to the original diameter of the insert 10. Thus, as grooves are formed in the tube end portion 44, material migrates to form the adjacent crests.

Figure 8:
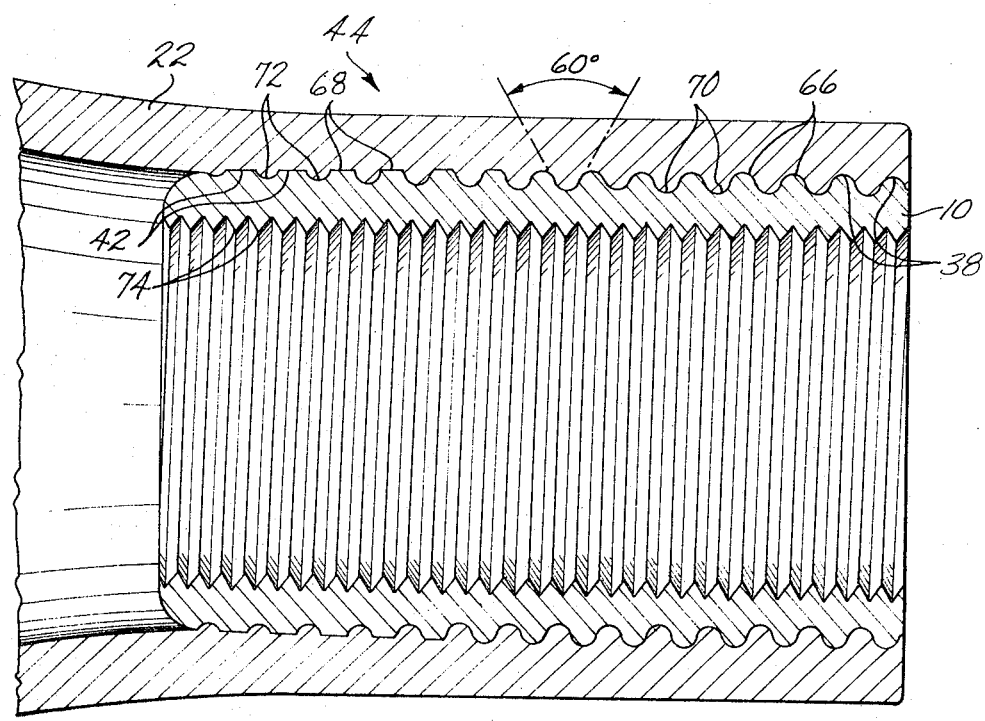
FIG. 8 is an enlarged, fragmentary, sectional view showing a tube swaged to an insert in accordance with my invention.

Referring now to FIG. 8, which shows the tube end portion 44 as swaged to the insert 10, the crests 38, 42 of the insert imprint grooves 66, 68 in the tube end portion 44 and the crests 70, 72 are formed by material migrating and forming said crests. Due to the fact that the cubic content of the insert 10 has not changed because of the imprinting of the grooves 36 and 40 therein and the formation of the crests by the migration of material from said grooves nor by the indentation of the longitudinally extending grooves 64 by imprinting or indenting (and consequent rises elsewhere), the tube end portion 44 may be swaged thereto and there will be present the amount of material necessary for forming the mating portions, crests 70 and crests 72, in the tube end portion 44.

After the swaging of tube end portion 44 to insert 10, the insert 10 may be drilled and tapped to form threads 74 as illustrated in connection with FIG. 8. Thus, the insert 10 may be connected by the threads 74 adjustably with a load, whether a compression load or a tension load. Instead of drilling and tapping insert 10, insert 10 may be the shank of a load connector and thus the load connector and the tube 22 become fixedly secured together. Prior to such swaging of the tube end portion 44 to the insert 10, the relative positions of the insert 10 is with Section 3 (FIGS. 3 and 4) positioned at the terminal end portion of the tube 22 as shown in FIG. 8. Thus, the terminal end portion of tube 22 connects with the insert 10 at a location where the grooves 36 and crests 38 of insert 10 and the grooves 66 and crests 70 of tube 22 are each substantially full and at a location of complete load transfer between the insert 10 and the tube 22. Also, at the location of the commencement of the load transfer, the grooves 40 and crests 42 in the insert 10 and the grooves 68 and crests 72 in the tube 22 are incomplete and thus the load is gradually engaged or transferred as said grooves and crests are gradually completed in the direction toward the grooves and crests which are complete.

In FIG. 2 of the drawings, the roll dies 16 and 18 are shown longer than the insert 10. Thus, the same dies 16 and 18 may be used, not only in connection with inserts of the length indicated for the insert 10, but longer inserts. As the dies 16 and 18 are rather expensive to make, the value of such length in the dies 16 and 18 will be obvious.

Thus, there has been illustrated and described a swage joined insert 10 and an end portion 44 of a tube 22. The insert 10 was a cylindrical body member, preferably having an original common diameter. On the periphery of the insert are formed a plurality of alternately spaced annular crests 38, 42 and grooves 36, 40 formed by a thread-rolling machine 16, 18, 20 (FIG. 2), where the crests 38, 42 on the insert were formed by the material displaced or migrating during the formation of the adjacent grooves 36, 40 in the insert 10 by the crests 24, 30 on roll dies 16 and 18. The roll dies 16 and 18 are harder than the insert 10 and thus permit the imprinting of the grooves in the insert 10 without deforming the pattern of the grooves and crests on the dies. Also, the insert 10 (When of stainless steel) is harder than the tube 22 (as of aluminum alloy) and when the end portion 44 of the tube 22 is swaged to the insert 10, the crests 38, 42 of the insert 10 imprint mating grooves 66, 68 in the tube 22 and without deformation of the crests and grooves in insert 10. In forming such grooves 66, 68 in the tube 22, the material displaced or which migrates forms crests 70, 72 in the tube 22 and the said crests 70, 72 directly mate with the grooves 36, 40 in the insert 10. Preferably, i.e., the crests and grooves in the insert 10 are disposed in two longitudinally spaced sections (Sections 3 and 4 of FIGS. 3 and 4) wherein the grooves 36 and the crests 38 of the first section thereof (Section 3), i.e., each has a substantially uniform diameter and wherein the grooves of a second section thereof (Section 4), i.e., each has a gradually increasing diameter and the crests 42 in said second section, each has a gradually decreasing diameter.

Next, the flank angle of the said crests 38, 42 and the said grooves 36, 40 is approximately 60°.

Also, the insert 10 preferably had an original common diameter indicated by lines 43 of FIG. 3 of the drawings.

Also, it will be apparent that by indenting or imprinting the longitudinally extending grooves 64 in the insert 10 prior to the swaging of the tube 22 to said insert 10, that longitudinally extending crests will be provided in the tube 22 and thus there is provided longitudinally extending interlocked tongues in the tube 22 and grooves 64 in the insert 10.

The foregoing illustrates combination structures provided in my invention and also illustrates the new method of my invention in the formation of such structures.

Obviously changes may be made in the forms, dimensions, and arrangements of the parts of my invention, without departing from the principle thereof, the foregoing setting forth only preferred forms of embodiment of my invention.

I claim:

1. A combination swage joined insert and tube comprising a metallic, cylindrical insert having a plurality of alternately spaced annular crests and grooves formed in the insert by a thread rolling machine and with said crests between said grooves formed by the material displaced in forming adjacent grooves, said crests and grooves being disposed in two longitudinally spaced sections, the grooves and crests in a first section each having a substantially common diameter and the grooves in a second section each having gradually increasing diameters and the crests in the second section each having gradually decreasing diameters; and a relatively softer metallic tube swaged to said insert where the material displaced in forming the grooves therein, mating with the crests of the insert, forms the crests therein mating with the grooves of the insert.

2. The combination of claim 1 wherein the flank angle of said crests and grooves is approximately 60°.

3. The combination of claim 1 wherein the said first section of said insert is disposed to mate grooves and crests at the terminal end portion of the tube.

4. The combination of claim 1, wherein the insert is formed from a cylindrical body having an original common diameter.

5. The combination of claim 1, wherein the tube had original, substantially uniform, external and internal diameters.

6. A combination swage joined insert and tube comprising a metallic, cylindrical insert having a plurality of alternately spaced annular crests and grooves formed in the insert by a thread rolling machine and with said crests between said grooves formed by the material displaced in forming adjacent grooves, said insert being provided with a plurality of longitudinally extending grooves prior to swaging and said tube is swaged to fill said grooves and provides longitudinally extending interlocked tongues in the tube and grooves in the insert, the said longitudinally extending grooves in said insert being of gradually decreasing depth with the deepest depth being disposed at an end portion of the insert having grooves mating with crests at the terminal end portion of said tube; and a relatively softer metallic tube swaged to said insert where the material displaced in forming the grooves therein, mating with the crests of the insert, forms the crests therein mating with the grooves of the insert.

* * * * *